US009638942B2

(12) United States Patent
Baehr-Jones et al.

(10) Patent No.: US 9,638,942 B2
(45) Date of Patent: May 2, 2017

(54) ULTRA-RESPONSIVE PHASE SHIFTERS FOR DEPLETION MODE SILICON MODULATORS

(71) Applicant: Coriant Advanced Technology, LLC, New York, NY (US)

(72) Inventors: Thomas Baehr-Jones, Arcadia, CA (US); Yang Liu, Elmhurst, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 14/840,409

(22) Filed: Aug. 31, 2015

(65) Prior Publication Data

US 2016/0062156 A1   Mar. 3, 2016

Related U.S. Application Data

(63) Continuation of application No. 14/060,058, filed on Oct. 22, 2013, now Pat. No. 9,158,138.

(Continued)

(51) Int. Cl.
*G02F 1/035* (2006.01)
*G02F 1/025* (2006.01)
(Continued)

(52) U.S. Cl.
CPC .............. *G02F 1/025* (2013.01); *G02F 1/015* (2013.01); *G02F 1/2257* (2013.01); *G02F 1/01* (2013.01);
(Continued)

(58) Field of Classification Search
CPC .. G02F 1/025; G02F 1/015; G02F 2001/0152; G02F 2001/0113;
(Continued)

(56) References Cited

U.S. PATENT DOCUMENTS 5,771,257 A     6/1998   Takiguchi et al.
6,298,177 B1 * 10/2001   House .................... G02F 1/025
                                                        385/3

(Continued)

FOREIGN PATENT DOCUMENTS

CN      103226252 A      7/2013
GB      1463886 A        2/1977
(Continued)

OTHER PUBLICATIONS

European Patent Office, Extended European Search Report for European Patent Application No. 13884522.7, mailed Dec. 5, 2016 (9 pages total).

(Continued)

*Primary Examiner* — Ryan Lepisto
*Assistant Examiner* — Guy Anderson
(74) *Attorney, Agent, or Firm* — Nixon Peabody LLP

(57) ABSTRACT

A novel phase shifter design for carrier depletion based silicon modulators, based on an experimentally validated model, is described. It is believed that the heretofore neglected effect of incomplete ionization will have a significant impact on ultra-responsive phase shifters. A low $V\pi L$ product of 0.3 V·cm associated with a low propagation loss of 20 dB/cm is expected to be observed. The phase shifter is based on overlapping implantation steps, where the doses and energies are carefully chosen to utilize counter-doping to produce an S-shaped junction. This junction has a particularly attractive $V\pi L$ figure of merit, while simultaneously achieving attractively low capacitance and optical loss. This improvement will enable significantly smaller Mach-Zehnder modulators to be constructed that nonetheless would have low drive voltages, with substantial decreases in insertion loss. The described fabrication pro- (Continued)

cess is of minimal complexity; in particular, no high-resolution lithographic step is required.

12 Claims, 13 Drawing Sheets

Related U.S. Application Data

(60) Provisional application No. 61/823,344, filed on May 14, 2013.

(51) Int. Cl.
*G02F 1/015* (2006.01)
*G02F 1/225* (2006.01)
*G02F 1/01* (2006.01)

(52) U.S. Cl.
CPC .............. *G02F 1/011* (2013.01); *G02F 1/035* (2013.01); *G02F 1/0353* (2013.01); *G02F 1/0356* (2013.01); *G02F 2001/0113* (2013.01); *G02F 2001/0152* (2013.01)

(58) Field of Classification Search
CPC ...... G02F 1/0356; G02F 1/035; G02F 1/0353; G02F 1/2257; G02F 1/011
USPC ................. 385/1–3; 359/237–240, 245, 248, 359/250–252, 254–255
See application file for complete search history.

(56) References Cited

U.S. PATENT DOCUMENTS

| | | | |
|---|---|---|---|
| 6,556,610 B1 | 4/2003 | Jiang et al. | |
| 7,085,443 B1* | 8/2006 | Gunn, III | G02F 1/025 359/245 |
| 7,751,654 B2* | 7/2010 | Lipson | G02F 1/025 385/1 |
| 8,019,185 B2* | 9/2011 | Yap | G02B 6/12007 385/1 |
| 8,380,016 B1* | 2/2013 | Hochberg | G02F 1/2257 385/131 |
| 8,994,107 B2* | 3/2015 | Bazizi | H01L 29/6659 257/344 |
| 2004/0160658 A1 | 8/2004 | Liu | |
| 2006/0008223 A1 | 1/2006 | Gunn, III | |
| 2006/0024066 A1 | 2/2006 | Fujiwara et al. | |
| 2006/0133754 A1* | 6/2006 | Patel | G02B 6/122 385/129 |
| 2006/0215949 A1* | 9/2006 | Lipson | G02F 1/025 385/2 |
| 2008/0003704 A1* | 1/2008 | Katsuyama | B82Y 20/00 438/16 |
| 2008/0175549 A1* | 7/2008 | Uetake | B82Y 20/00 385/131 |
| 2009/0315135 A1* | 12/2009 | Finkelstein | H01L 31/107 257/438 |
| 2010/0060970 A1* | 3/2010 | Chen | G02F 1/025 359/245 |
| 2010/0080504 A1* | 4/2010 | Shetrit | G02B 6/12004 385/14 |
| 2011/0206313 A1 | 8/2011 | Dong | |
| 2012/0057815 A1* | 3/2012 | Ezaki | G02F 1/025 385/3 |
| 2012/0189239 A1* | 7/2012 | Tu | G02F 1/025 385/2 |
| 2012/0257850 A1 | 10/2012 | Fujikata | |
| 2014/0054649 A1 | 2/2014 | Bazizi et al. | |
| 2014/0054679 A1* | 2/2014 | Tang | H01L 29/785 257/329 |

FOREIGN PATENT DOCUMENTS

| | | |
|---|---|---|
| GB | 2477935 A | 8/2011 |
| JP | 2001358153 A | 12/2001 |

OTHER PUBLICATIONS

F. Y. Gardes, et al.; "40 Gb/s silicon photonics modulator for TE and TM polarisations"; Optics Express, vol. 19, No. 12, Jun. 2, 2011; pp. 11804-11814; XP55322325; DOI: 10.1364/OE.19.011804 (11 pages).

M. R. Watts., et al.; "Low-Voltage, Compact, Depletion-Mode, Silicon Mach-Zehnder Modulator"; IEEE J. Selected Topics in Quantum Electronics; IEEE Service Center, Piscataway, NJ, US; vol. 16, No. 1, Jan. 1, 2010; pp. 159-164; XP011344353; ISSN: 1077-260X; DOI: 10.1109/JSTQE.2009.2035059 (6 pages).

Search Report of the Intellectual Property Office of Singapore, Application No. 11201509355S, date of completion of search Jun. 28, 2016 (3 pages).

Written Opinion of the Intellectual Property Office of Singapore, Application No. 11201509355S, date of Written Opinion Jul. 28, 2016 (7 pages).

International Search Report dated Apr. 24, 2014 in the international Application No. PCT/US2013/066134 corresponding to the parent U.S. Appl. No. 14/060,058.

\* cited by examiner

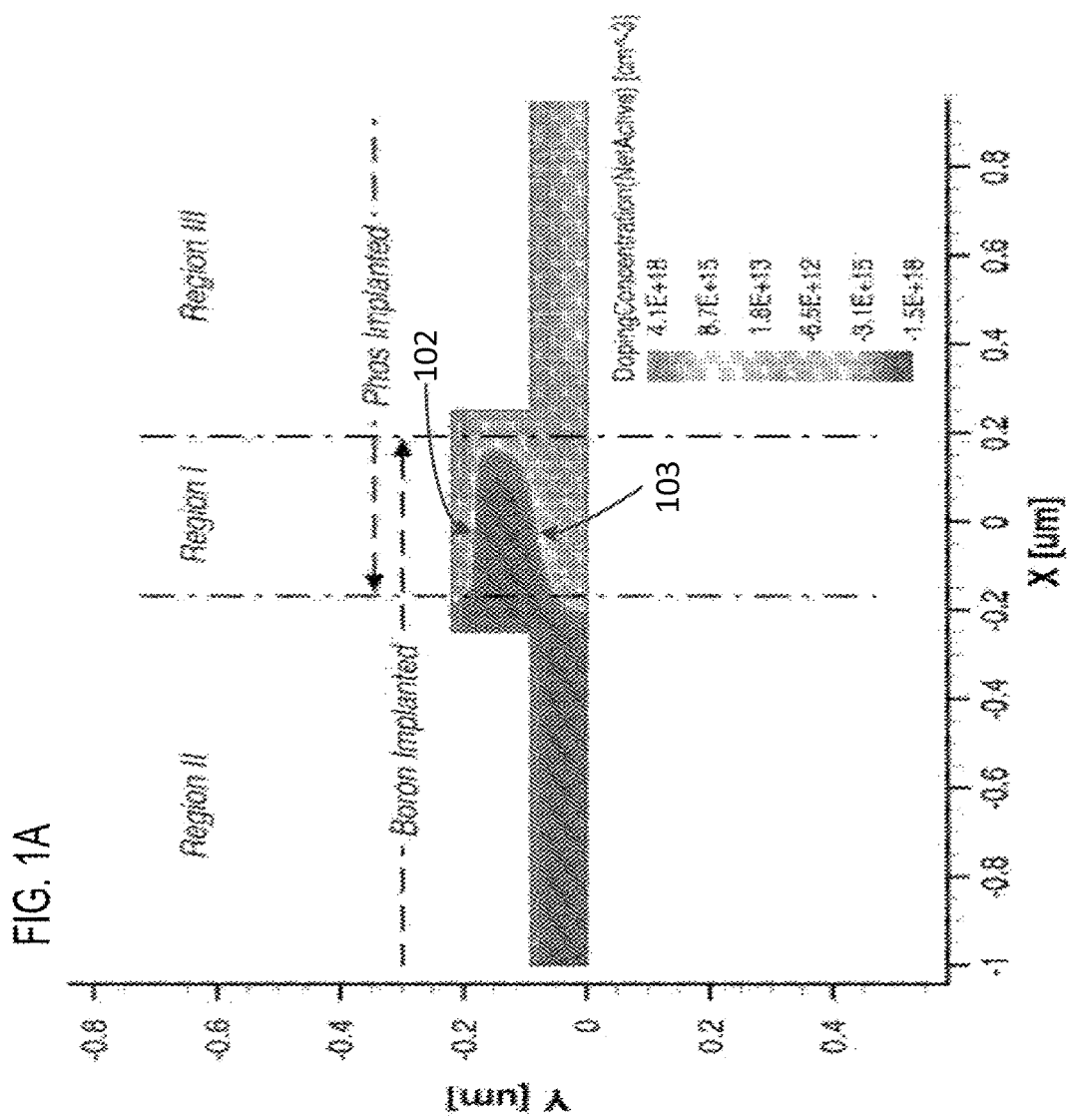

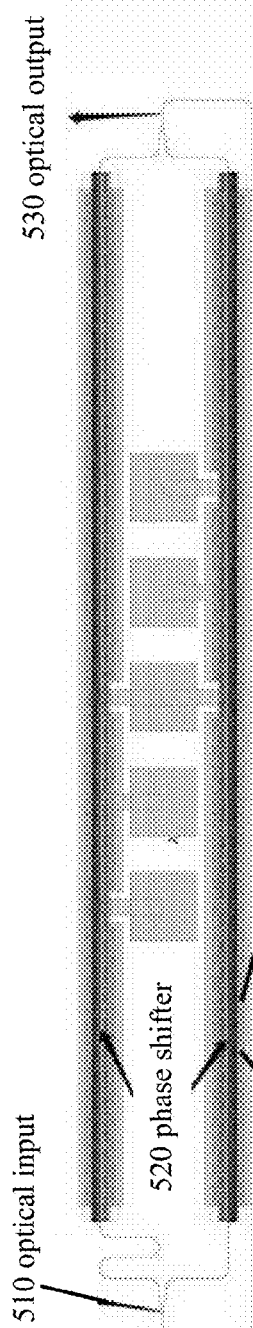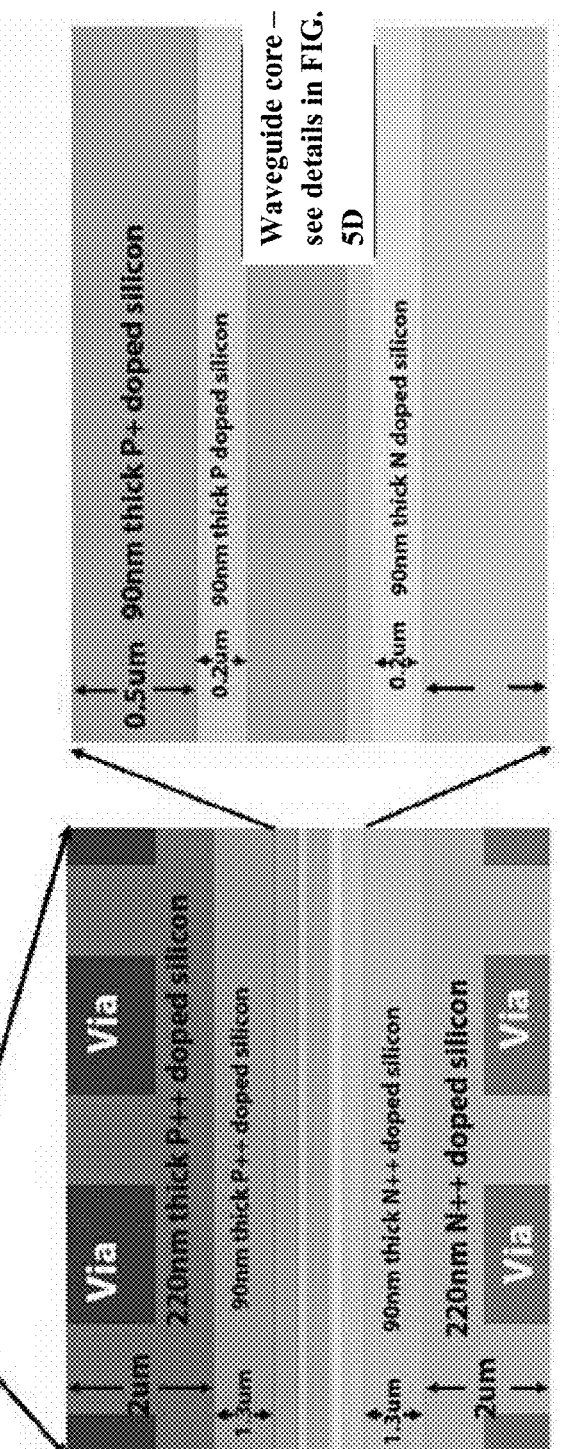
FIG. 5A
FIG. 5B
FIG. 5C

ULTRA-RESPONSIVE PHASE SHIFTERS FOR DEPLETION MODE SILICON MODULATORS

CROSS-REFERENCE TO RELATED APPLICATIONS

This application is a continuation of U.S. patent application Ser. No. 14/060,058 titled "ULTRA-RESPONSIVE PHASE SHIFTERS FOR DEPLETION MODE SILICON MODULATORS" filed on Oct. 22, 2013, now U.S. Pat. No. 9,158,138, which application claimed the priority to and the benefit of U.S. provisional patent application Ser. No. 61/823,344, filed May 14, 2013, each of which applications is incorporated herein by reference in its entirety.

FIELD OF THE INVENTION

The invention relates to phase shifters in general and particularly to optical phase shifters.

BACKGROUND OF THE INVENTION

In the past decade, there has been a rapidly growing need for communication bandwidth from high-performance computing and datacenters (see for example, G. T. Reed, G. Mashanovich, F. Y. Gardes, and D. J. Thomson, "Silicon optical modulators," Nat. Photonics 4(8), 518-526 (2010)). Silicon photonics technology has shown great potential to become a low cost and reliable solution for next generation interconnects due to its compatibility with CMOS technology (see for example, Y. A. Vlasov, "Silicon CMOS-integrated nano-photonics for computer and data communications beyond 100G," IEEE Commun Mag. 50(2), 67-72 (2012)). However, for silicon photonics technology to be widely adopted, a key challenge that needs to be addressed is achieving efficient and high-speed modulation in silicon, while consuming a minimal amount of die area. To minimize the optical and electrical power consumption, the silicon modulator is expected to have low insertion loss and driving voltage, while operating at high data rates (see for example, Miller, D. "Device requirements for optical interconnects to silicon chips". *Proc. IEEE* 97, 1166-1185 (2009)).

Today, carrier-depletion based modulators are among the most competitive approaches for data communication applications due to a relatively simple fabrication process and high operation speed. In this approach, a PN junction is formed inside a rib silicon waveguide by implantation. Optical modulation is obtained via the carrier dispersion effect (see for example, R. A. Soref, and B. R. Bennett, "Electrooptical effects in silicon," IEEE J. Quantum Electron. 23(1), 123-129 (1987)) by depleting the free carriers in the PN junction. The optical phase modulation can be converted to intensity modulation by structures such as Mach-Zehnder interferometer and ring resonator. Silicon modulators operating at 25 Gb/s and beyond has been demonstrated by several groups based on this idea (see for example, L. Liao, A. Liu, D. Rubin, J. Basak, Y. Chetrit, H. Nguyen, R. Cohen, N. Izhaky, and M. Paniccia, "40 Gbit/s silicon optical modulator for high-speed applications," Electron. Lett. 43(22), 1196-1197 (2007); T. Baehr-Jones, R. Ding, Y. Liu, A. Ayazi, T. Pinguet, N. C. Harris, M. Streshinsky, P. Lee, Y. Zhang, A. E. Lim, T. Y. Liow, S. H. Teo, G. Q. Lo, and M. Hochberg, "Ultralow drive voltage silicon traveling-wave modulator," Opt. Express 20(11), 12014-12020 (2012); M. Ziebell, D. Marris-Morini, G. Rasigade, J.-M. Fédéli, P. Crozat, E. Cassan, D. Bouville, and L. Vivien, "40 Gbit/s low-loss silicon optical modulator based on a pipin diode," Opt. Express 20(10), 10591-10596 (2012); D. J. Thomson, F. Y. Gardes, Y. Hu, G. Mashanovich, M. Fournier, P. Grosse, J.-M. Fedeli, and G. T. Reed, "High contrast 40 Gbit/s optical modulation in silicon," Opt. Express 19(12), 11507-11516 (2011); J. Ding, H. Chen, L. Yang, L. Zhang, R. Ji, Y. Tian, W. Zhu, Y. Lu, P. Zhou, R. Min, and M. Yu, "Ultra-low-power carrier-depletion Mach-Zehnder silicon optical modulator," Opt. Express 20(7), 7081-7087 (2012); Long Chen, Christopher R. Doerr, Po Dong, and Young-kai Chen, "Monolithic silicon chip with 10 modulator channels at 25 Gbps and 100-GHz spacing," Opt. Express 19, B946-B951 (2011); J. C. Rosenberg, W. M. J. Green, S. Assefa, D. M. Gill, T. Barwicz, M. Yang, S. M. Shank, and Y. A. Vlasov, "A 25 Gbps silicon microring modulator based on an interleaved junction," Opt. Express 20, 26411-26423 (2012); Xi Xiao, Hao Xu, Xianyao Li, Yingtao Hu, Kang Xiong, Zhiyong Li, Tao Chu, Yude Yu, and Jinzhong Yu, "25 Gbit/s silicon microring modulator based on misalignment-tolerant interleaved PN junctions," Opt. Express 20, 2507-2515 (2012); and Guoliang Li, Xuezhe Zheng, Jin Yao, Hiren Thacker, Ivan Shubin, Ying Luo, Kannan Raj, John E. Cunningham, and Ashok V. Krishnamoorthy, "25 Gb/s 1V-driving CMOS ring modulator with integrated thermal tuning," Opt. Express 19, 20435-20443 (2011)). A large fraction of these results are based on phase shifters with a simple PN junction geometry, either lateral or vertical inside a waveguide.

One important fact to note about current approaches is that the traveling-wave devices tend to be long—often several mm or more. This is due to the fairly weak electro-optic effect in silicon. It is possible to increase the phase shift per unit voltage (characterized by the FOM $V\pi L$) associated with the silicon pn-junction, but only by increasing the dopant concentration, which subsequently raises the waveguide loss. This fundamental tradeoff has been observed elsewhere (see for example, Hui Yu, Marianna Pantouvaki, Joris Van Campenhout, Dietmar Korn, Katarzyna Komorowska, Pieter Dumon, Yanlu Li, Peter Verheyen, Philippe Absil, Luca Alloatti, David Hillerkuss, Juerg Leuthold, Roel Baets, and Wim Bogaerts, "Performance tradeoff between lateral and interdigitated doping patterns for high speed carrier-depletion based silicon modulators," Opt. Express 20, 12926-12938 (2012); and Hui Yu; Bogaerts, W.; De Keersgieter, A., "Optimization of Ion Implantation Condition for Depletion-Type Silicon Optical Modulators," *Quantum Electronics, IEEE Journal of*, vol. 46, no. 12, pp. 1763, 1768, December 2010), and a loss-efficiency figure of merit (see for example, Xiaoguang Tu, Tsung-Yang Liow, Junfeng Song, Mingbin Yu, and Guo Qiang Lo, "Fabrication of low loss and high speed silicon optical modulator using doping compensation method," Opt. Express 19, 18029-18035 (2011)) (F value) has been introduced to characterize the loss-$V\pi L$ trade off of the phase shifter. A phase shifter with lower F value is able to achieve the same $V\pi$ with a lower optical insertion loss, which is highly desirable. Therefore, lower F values are better. So far in literature, the F value for a simple junction geometry that does not require high-resolution inter-digitation is typically 10~30 (see for example, Watts, M. R.; Zortman, W. A.; Trotter, D. C.; Young, R. W.; Lentine, A. L., "Low-Voltage, Compact, Depletion-Mode, Silicon Mach-Zehnder Modulator," *Selected Topics in Quantum Electronics, IEEE Journal of*, vol. 16, no. 1, pp. 159, 164, January-February 2010), the lowest reported F value is 10.5 dB-V (see for example, Xi Xiao, Hao Xu, Xianyao Li, Zhiyong Li, Tao Chu, Yude Yu, and Jinzhong Yu, "High-speed, low-loss silicon Mach- Zehnder modulators with doping optimization," Opt. Express 21, 4116-4125 (2013)) with 1.5 V·cm VπL.

Simply raising the dopant concentrations will actually lead to a less favorable F metric. However, more complex junction geometries such as interleaved junctions and "zigzag" junctions (see for example, Xi Xiao; Xianyao Li; Hao Xu; Yingtao Hu; Kang Xiong; Zhiyong Li; Tao Chu; Jinzhong Yu; Yude Yu, "44-Gb/s Silicon Microring Modulators Based on Zigzag PN Junctions," *Photonics Technology Letters, IEEE*, vol. 24, no. 19, pp. 1712, 1714, Oct. 1, 2012)) exhibit more favorable F values. In these designs, the junction area per unit length is intentionally increased to enhance the carrier-light interaction. By this means, 0.24 V·cm VπL with 16 dB/cm optical loss is theoretically predicted (see for example, Zhi-Yong Li, Dan-Xia Xu, W. Ross McKinnon, Siegfried Janz, Jens H. Schmid, Pavel Cheben, and Jin-Zhong Yu, "Silicon waveguide modulator based on carrier depletion in periodically interleaved PN junctions," Opt. Express 17, 15947-15958 (2009)) (F=3.84 dB-V). These are promising results, but to achieve this ultra low VπL, a 200 nm inter-digitation period is required; this will present difficulties as currently most silicon photonics implant layers are fabricated with lower-resolution masks. So far, the best VπL experimentally achieved in even a 193 nm lithography process is 0.62 V·cm associated with 35 dB/cm optical loss (F=21.7 dB-V). Other methods like compensated doping and PIPIN junction geometry are also been explored in order to reduce the optical loss, however the VπL reported is still relatively high, with F values typically 19 dB-V or higher.

There is a need for optical modulators that did not require high-resolution lithography for their fabrication.

SUMMARY OF THE INVENTION

According to one aspect, the invention features an optical modulator semiconductor device. The optical modulator semiconductor device comprises an optical waveguide comprising a semiconductor having an optical index higher than 3; a p-type region of semiconductor material fabricated in the optical waveguide, the p-type region having a p-type contact terminal; and an n-type region of semiconductor material fabricated in the optical waveguide, the n-type region having an n-type contact terminal; the n-type region and the p-type region having a non-planar junction interface having a length dimension, the non-planar common junction configured to increase a junction area between the n-type region and the p-type region per unit length of the length dimension of the junction so as to enhance an overlap between an optical mode in the optical waveguide and the junction area when the optical modulator semiconductor device is operational.

In one embodiment, the non-planar junction interface comprises a curved surface having a convex side and a concave side.

In another embodiment, the curved surface resembles the English letter "C".

In yet another embodiment, the curved surface resembles the English letter "U".

In still another embodiment, the curved surface resembles the English letter "S".

In a further embodiment, the p-type region is on the concave side of the non-planar junction interface and the n-type region is on the convex side of the non-planar junction interface.

In yet a further embodiment, the n-type region is on the concave side of the non-planar junction interface and the p-type region is on the convex side of the non-planar junction interface.

According to another aspect, the invention relates to a method of fabricating an optical modulator semiconductor device. The method comprises the steps of providing a semiconductor material in planar form; forming a slab waveguide structure from the semiconductor material by an anisotropic etch; depositing a thin layer of an insulator conformally on top of the slab waveguide; implanting n-type and p-type dopants into the slab waveguide in multiple implantation steps to produce n-type and p-type regions, respectively; and annealing the implanted slab waveguide structure; thereby forming within the slab waveguide structure a p-type region and an n-type region, the n-type region and the p-type region having a non-planar junction interface having a length dimension, the non-planar common junction configured to increase a junction area between the n-type region and the p-type region per unit length of the length dimension of the junction, so as to so as to enhance an overlap between an optical mode in the optical waveguide and the junction area when the optical modulator semiconductor device is operational.

In one embodiment, the semiconductor material in planar form is a silicon-on-insulator wafer.

In another embodiment, the step of implanting n-type and p-type dopants into the slab waveguide in multiple implantation steps is performed according to the parameters in Table 1.

In yet another embodiment, the annealing step is performed using rapid thermal annealing (RTA).

In still another embodiment, a contact is provided to at least one of the n-type region and the p-type region by heavily doping a region adjacent the at least one of the n-type region and the p-type region with a dopant of the same type as the region.

In a further embodiment, the counter-doping technique is applied to allow several implants to combine in a linear fashion to create pn junctions with nonlinear shapes in silicon for the purpose of achieving optical modulation.

In yet a further embodiment, the non-planar junction interface has a shape geometry similar in shape to one of the English letters "U", "C", and "S".

In an additional embodiment, the step of implanting n-type and p-type dopants into the slab waveguide in multiple implantation steps is performed according to the parameters in Table 2.

According to another aspect, the invention relates to a method of modulating an optical carrier in an optical modulator semiconductor device, having an optical waveguide comprising a semiconductor having an optical index higher than 3; a p-type region of semiconductor material fabricated in the optical waveguide, the p-type region having a p-type contact terminal; and an n-type region of semiconductor material fabricated in the optical waveguide, the n-type region having an n-type contact terminal; the n-type region and the p-type region having a non-planar junction interface having a length dimension, the method comprising the steps of providing an optical carrier at an input port of the optical modulator semiconductor device; providing an electrical signal across the n-type contact terminal and the p-type contact terminal, the electrical signal operating to reverse-bias the pn junction to alter a depletion region size of the pn junction, thereby modulating the optical carrier; and receiving the modulated optical carrier as an output signal at an output port of the optical modulator semiconductor device.

In one embodiment, the non-planar junction interface has a shape geometry similar in shape to one of the English letters "U", "C", and "S".

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A is a schematic diagram showing a simulated dopants distribution on the cross-section of the phase shifter, following the implantation and annealing conditions listed in Table 1.

FIG. 5A is an illustration of a Mach Zehnder interferometer built using devices fabricated according to principles of the invention.

FIG. 5B is a diagram illustrating the detailed doping mask for the phase shifter, in which N and P implantations overlap in the center of the waveguide.

FIG. 5C is a diagram illustrating a more detailed view of a portion of the doping mask in FIG. 5B.

DETAILED DESCRIPTION

Figure 1B:
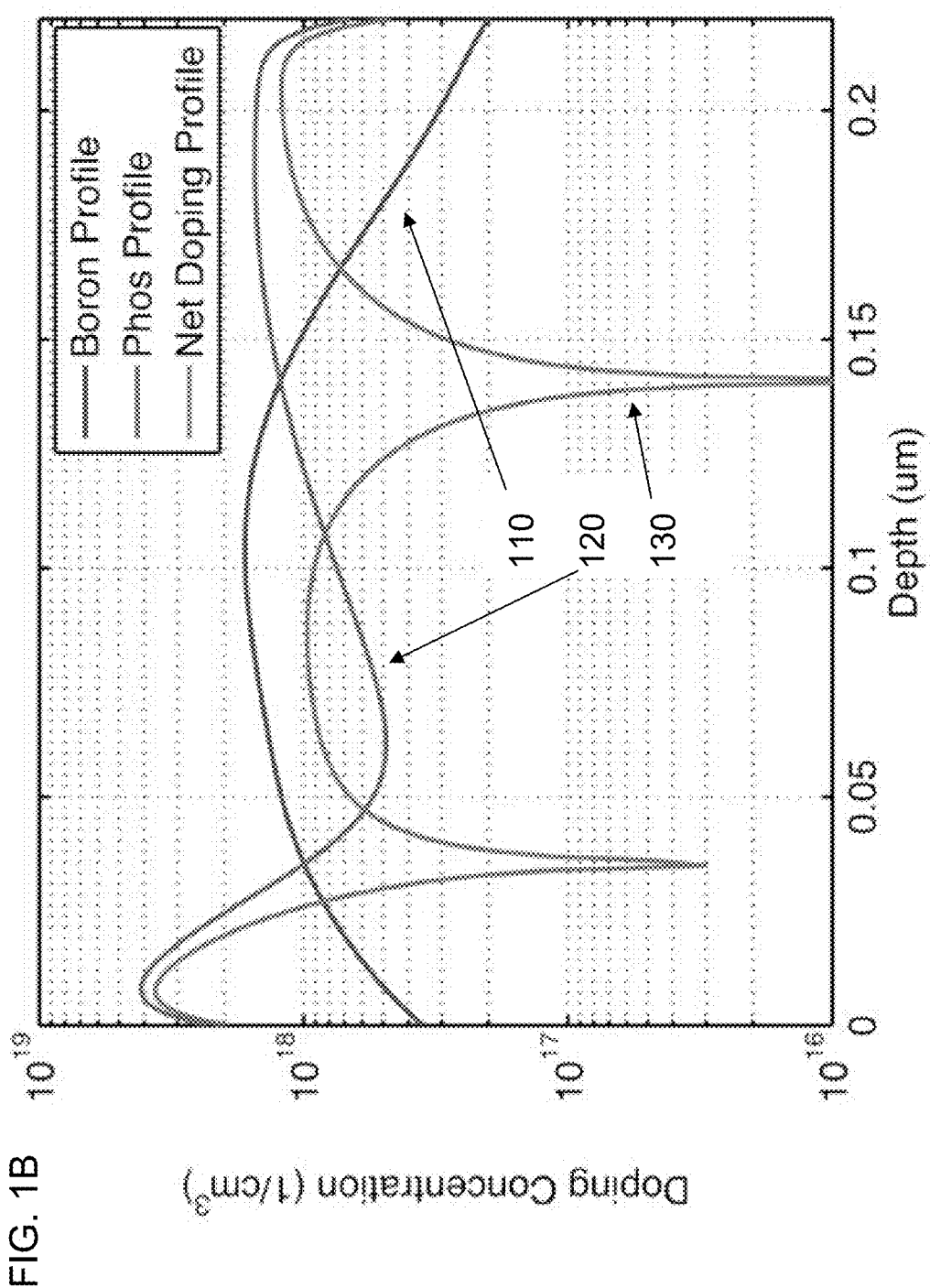
FIG. 1B is a graph showing the depth profiles of boron (curve 110), phosphorus (curve 120) and the net profile (curve 130) in a section through Region I of FIG. 1A.

We describe a novel phase shifter design with a S shape junction geometry that provides ultra low $V\pi L$ of 0.3 V·cm associated with only 20 dB/cm optical loss (F=6 dB-V). The fine structure of the junction geometry is controlled by implantation conditions rather than lithography, minimizing the requirement on the resolution and thus the cost of the implantation masks.

The S shape geometry will depend heavily on the exact configuration of dopants in the final annealed silicon. Because of the high dopant concentrations, a number of effects that are generally neglected in implant design must be taken into account. In particular, surface segregation induced dose loss (See for example P. B. Griffin, S. W. Crowder, and J. M. Knight "Dose loss in phosphorus implants due to transient diffusion and interface segregation" Appl. Phys. Lett. 67, 482 (1995)), and implantation-based damage must be considered. We show SIMS data that confirms the significance of surface segregation, and allows us to calibrate our implant recipe to achieve the desired goal. Further, we note that incomplete ionization, a well-known effect in semiconductors at high dose levels (See for example, Wiesaw Kuźmicz, Ionization of impurities in silicon, Solid-State Electronics, Volume 29, Issue 12, December 1986, Pages 1223-1227; and S. M. Sze and K. K. Ng, *Physics of Semiconductor Devices*. New York: Wiley, 2007, pp. 79-90), must be considered. The effects of incomplete ionization are measured and help explain what would otherwise be a significant discrepancy as compared to experimental data we present hereinbelow. This effect has been ignored up until now in silicon depletion modulator design, as the impact has been small. However in more advanced junctions with more complex implant structures, a complete understanding of all of the effects we discuss will likely be important.

Principle of Operation

As discussed earlier, an important consideration to improve the modulation efficiency of the silicon phase shifter without suffering from high optical loss is to increase the overlap between the optical mode and the depletion region, while keeping a moderate doping level. In our design, this goal is achieved by implementing novel junction geometry in the waveguide, whose junction line wraps around like an S shape. In other embodiments the junction can be shaped in a manner similar to the English letters "C" or "U." Comparing with a conventional lateral junction, the S shaped junction geometry has a substantially larger surface area per unit length. In this way, a high modulation efficiency and relatively low optical loss can be achieved simultaneously. It is anticipated that this modulation will be operated by reverse-biasing the pn junction to alter the depletion region size, thus achieving modulation. We first describe how this S junction can be fabricated in a photonics foundry, and then explain the fabrication steps in detail.

Optical modulation will be achieved for radiation with free-space wavelengths near 1550 nm and 1310 nm based on the free-carrier plasma dispersion effect and reverse biasing the pn junction diode intrinsic to the pn interface. The modulation effect will be enhanced by a maximization of the overlap between the optical mode in a waveguide and the junction geometry, as shown in FIG. 1A.

FIG. 1A is a schematic diagram showing a simulated dopants distribution on the cross-section of the phase shifter, following the implantation and annealing conditions listed in Table 1.

FIG. 1B is a graph showing the depth profiles of boron (curve 110), phosphorus (curve 120) and the net profile (curve 130) in a section through Region I of FIG. 1A.

The fabrication starts from an SOI wafer with a 220 nm top silicon layer and a 2 μm buried oxide layer (BOX). The silicon slab waveguide structure was defined by a 130 nm anisotropic etch. The resulted slab waveguide has 500 nm width, 220 nm rib height and 90 nm slab height. After the etching, a thin layer (10 nm) of $SiO_2$ is conformally deposited on top of the silicon surface to minimize the channeling effect in the following implantation steps. Multiple implantation steps are then performed with implantation conditions listed in Table I. Boron and phosphorus beams are implanted into the wafer from four cardinal directions, with different tilt angles. In steps 1-4, 7° tilt angle is used to minimize the ion channeling effect. In step 5, 45° tilt angle is used to implant the right side wall of the waveguide with phosphorus, in order to ensure electrical connectivity along the sidewall. After the implantation, a 5 second rapid thermal annealing (RTA) step at 1030° C. is used to activate the dopants. The distribution of dopants on a cross-section of the phase shifter is simulated with a semiconductor process simulator Sentaurus Process, and plotted in FIG. 1B. While specific implant energies are listed in Table I, it is known that the implantation can be done with other, slightly modified energies, and still obtain a useful outcome. For example, one can do step 2 at 33 KeV rather than the 32 KeV energy listed in Table 1.

TABLE 1

Implantation Conditions for Baseline design

| Step | Species | Energy/KeV | Dose/cm$^2$ | Implantation Window | Tilt Angle |
|---|---|---|---|---|---|
| 1 | Boron | 14 | $3.5 \times 10^{12}$ | (−1, 0.15) | 7 |
| 2 | Boron | 32 | $2.0 \times 10^{13}$ | (−1, 0.15) | 7 |
| 3 | Phos | 160 | $3.0 \times 10^{13}$ | (−0.15, 1) | 7 |
| 4 | Phos | 15 | $1.0 \times 10^{13}$ | (−0.15, 1) | 7 |
| 5 | Phos | 10 | $7.0 \times 10^{12}$ | (−0.15, 1) | 45 |
| 6 | RTA | | 1030° C. 5 s | | |

In the above recipe, the rib height and slab height of the silicon waveguide are chosen as typical values provided by photonics foundry today for simplicity (see for example, R. Ding, T. Baehr-Jones, T. Pinguet, J. Li, N. C. Harris, M. Streshinsky, L. He, A. Novack, E. Lim, T. Liow, H. Teo, G. Lo, and M. Hochberg, "A Silicon Platform for High-Speed Photonics Systems," in Optical Fiber Communication Conference, OSA Technical Digest (Optical Society of America, 2012), paper OM2E.6). The S shaped junction geometry in the waveguide is achieved by carefully controlled implantation conditions. First of all, the depth (vertical direction in the waveguide) profiles of boron and phosphorus are designed as follows. Phosphorus is implanted with a high energy and a low energy step so the profile has two peaks, one near the top of the waveguide, and the other near the bottom. The main dose of boron is implanted with a single energy so the profile only shows one peak in the middle of the waveguide. Second, in the lateral direction, the implantation windows of boron and phosphorus are designed to have an overlap region in the core of the waveguide.

We utilize a technique in our junction known as counter-doping (see for example, J. D. Plummer, Michael Deal, and P. D Griffin "Silicon VLSI Technology: Fundamentals, Practice, and Modeling", Prentice-Hall, 2000). In this technique, both acceptors (boron) and donors (phosphorus or arsenic) are implanted into silicon and the polarity of the silicon is finally determined by the difference between the acceptor and donor concentration. Silicon will appear to be p type if the acceptor concentration exceeds the donor concentration, and will appear to be n-type if the donor concentration exceeds the acceptor concentration. When applying this technique to an optical device, it is important to maintain the single crystalline property of the waveguide. This requires the accumulated damage in the implantation process to be less than the amorphous threshold of $5 \times 10^{21}$ defects/cm$^3$.

The forming of the S shaped junction geometry can be understood as follows. With regard to FIG. 1A, in the lateral direction (x direction), the slab phase shifter is divided into 3 regions by the implantation masks of boron and phosphorus. Region I is exposed to both boron and phosphorus implantation. As illustrated in FIG. 1B, because in the vertical direction, phosphorus concentration (curve 120) exceeds boron (curve 110) near the top and bottom of the waveguide, while boron concentration exceeds phosphorus near the middle of the waveguide, the middle part of the waveguide will appear to be P type, while the top and bottom part of the waveguide will be N type. Region II, including the left edge of the phase shifter, and the left side of the silicon slab is P type doped, because it's only exposed to boron implantation. On the other hand, region III, including the right edge of the waveguide core and right side of the silicon slab is N type doped since it's exposed to only phosphorus implantation. Region II and III act as electrical paths that connect the junction region and the electrodes. After annealing, a junction line will form between the N and P type doped region, wrapping around the center of the waveguide.

In the implantation design, several important facts are taken into consideration. First of all, it's reported that in the RTA step, the phosphorus atoms can be trapped in the Si/SiO$_2$ surface due to surface segregation. This effect will cause a loss of phosphorus dose, and thus a decreased phosphorus concentration near the top of the waveguide. In our design, the dose of the low energy phosphorus implantation step is intentionally increased to compensate for the surface segregation, and ensure the top part of the silicon rib is N type. Second, because the P/N overlapped region, the damage due to boron and phosphorus implantation will accumulate. It is important to keep the accumulated damage after the implantation steps below the silicon amorphous threshold $5 \times 10^{21}$/cm$^3$. Otherwise, the silicon layer will be amorphorized, and will be hard to heal in the annealing step, causing extra optical loss.

Figures 2A, 2B:
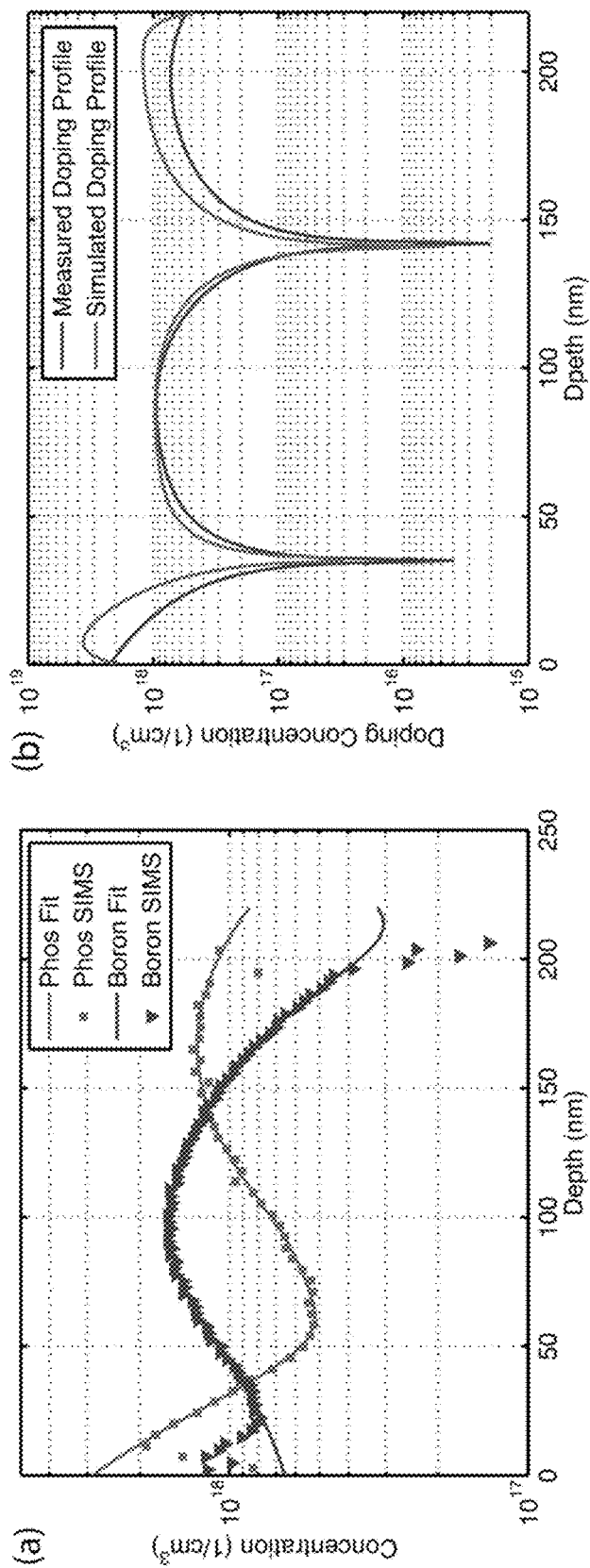
FIG. 2A is a graph showing the boron (triangles) and phosphorus (squares) concentration as a function of depth measured by SIMS. Multiple peak Gaussian functions are used to fit the data points.
FIG. 2B is a graph of the measured and designed net doping profile.

From the preceding discussion, the depth profile of boron and phosphorus is an important consideration to implement this design. To ensure the S shaped junction line, two PN junctions at different depth must be formed in the region where the boron and phosphorus implantation overlaps; these two PN junctions are indicated in FIG. 1A at 102 and 103. An implantation experiment was performed to verify the profile design. In the implantation experiment, boron and phosphors were uniformly implanted into a SOI wafer with a 220 nm thick top silicon layer and a 10 nm thick screening SiO2 layer without any masking. The etching step was not performed to define the waveguide structure, making it easier to measure the depth doping profile. The implantation and annealing steps are the same as listed in Table I. After annealing, the 10 nm screening SiO2 layer was removed. Secondary Ion Mass Spectrometry (SIMS) analysis was performed to characterize the boron and phosphorus concentration as a function of depth. The boron and phosphorus profiles were extracted by fitting the SIMS data with multiple peak Gaussian functions as shown in FIG. 2A. SIMS data near the top surface (~20 nm) of the silicon is inaccurate because the rapidly changing surface chemistry leads to an unstable ion yield. Therefor these data points were excluded from the fit. The SIMS measured net doping profile and the designed profile is shown in FIG. 2B. As we can see clearly, two PN junctions are formed in silicon at about 35 nm and 140 nm from the surface. The top region (0~35 nm) and bottom region (140~220 nm) are N type doped, while the middle region (35~140 nm) is P type doped. As shown in FIG. 2B, a measured doping profile and a simulated doping profile are in good agreement. With this depth profile, it is expected that when the same implantation recipe is applied on a slab waveguide with the designed masking window, the desired S junction geometry can be formed successfully.

Phase Shifter Performance

We now present an analysis of the performance of the S junction phase shifter design. The important metrics for a phase shifter includes modulation efficiency (VπL), optical loss, and electrical characteristics such as junction capacitance and resistance. Here we present a simulation technique to accurately predict the performance of a silicon phase shifter by combined semiconductor process simulation, electrical device simulation and optical mode solving. The model is first calibrated experimentally on a lateral junction silicon phase shifter, and then used to analyze the performance and tradeoffs of the S junction phase shifter design.

Simulation Method

The simulation flow starts from semiconductor process simulation. Sentaurus Process (modeling tools available from Synopsys, Inc., 700 East Middlefield Rd., Mountain View, Calif. 94043-4033 U.S.A.) is used to model the etching, implantation, and annealing steps of the phase shifter fabrication. In the end of the process simulation, a virtual phase shifter model containing the information of waveguide geometry and spatial distribution of dopants is created. Next, the virtual phase shifter model is solved using a finite element semiconductor device solver Sentaurus Device (modeling tools available from Synopsys, Inc., 700 East Middlefield Rd., Mountain View, Calif. 94043-4033 U.S.A.) under different bias voltages. The distribution of free electrons and holes is obtained by solving the Poisson equation fully coupled to electron and hole current continuity equation. A small signal AC simulation is performed to extract the capacitance of the structure at each bias voltage. During the device simulation, the following physics models are used:

1. Mobility models including doping dependence and high-field saturation;
2. Shockley-Read-Hall recombination with doping-dependent lifetime; and
3. The incomplete ionization model.

After the device simulation is complete, the electrical characteristics such as junction capacitance and parasitic resistance are fully determined. To calculate the modulation efficiency and optical propagation loss of the virtual phase shifter, an optical mode solver is employed to compute the transverse optical mode in the waveguide. The mode solver takes the simulated waveguide geometry as input, and assumes that no free carriers are present in the waveguide. This is a good approximation because the change of refractive index induced by free carriers is tiny (<0.1%) compared to the refractive index of silicon. In the presence of free carriers, the local change of refractive index at 1.55 um wavelength is predicted by the plasma dispersion formula:

$$\Delta n(x,y) = -8.8 \times 10^{-22} \Delta N_e(x,y) - 8.5 \times 10^{-18} \Delta N_h(x,y)^{0.8}$$

$$\Delta \alpha(x,y) = 8.5 \times 10^{-18} \Delta N_e(x,y) + 6.0 \times 10^{-18} \Delta N_h(x,y) \quad (1)$$

where $\Delta N_e(x,y)$ and $\Delta N_h(x,y)$ are the free electron and hole contribution obtained from the device simulation. Knowing the local change of refractive index and optical loss on the cross-section of a waveguide, the overall change of the effective index and optical loss of the waveguide can be derived by applying the mode perturbation theory (see for example, Baehr-Jones, T.; Hochberg, M.; Walker, C.; Eric Chan; Koshinz, D.; Krug, W.; Scherer, Axel, "Analysis of the tuning sensitivity of silicon-on-insulator optical ring resonators," Lightwave Technology, Journal of, vol. 23, no. 12, pp. 4215, 4221). We obtain as a result:

$$\Delta n_{eff} = \frac{n_{si} \int\int_{si} \Delta n(x,y) |\vec{E}(x,y)|^2 dxdy}{Z_0 \int\int \text{Re}(\vec{E} \times \vec{H}^*) dxdy} \quad (2)$$

$$\Delta \alpha = \frac{n_{si} \int\int_{si} \Delta \alpha(x,y) |\vec{E}(x,y)|^2 dxdy}{Z_0 \int\int \text{Re}(\vec{E} \times \vec{H}^*) dxdy}$$

Here, $n_{si}=3.48$ denotes the refractive index of crystalline silicon at 1.55 um, and $Z_0=377\Omega$, denotes the impedance of free space. E(x,y) and H(x,y) are the transverse model profile of the unperturbed waveguide. Note after carrying out the overlap integral (2), the change of effective index and optical loss is only a function of bias voltage applied on the electrodes, which is implicitly contained in the distribution of free electrons and holes. The effective index change can be readily converted to the modulation efficiency figure of merit VπL of the phase shifter. We follow the small signal VπL definition from −0.5V to 0.5V.

It's worth mentioning, in the modeling of the phase shifter, the incomplete ionization (I.I) plays an important role. At room temperature, a fraction of the dopant atoms will not be ionized even if almost 100% of the dopants are electrically activated after implantation. This is a result of the Fermi statistics. Basically, when silicon is heavily doped, and the Fermi level comes close to the impurity energy level, some of the donor/acceptor states will be occupied by an electron/hole, respectively, so that they no longer act as donors/acceptors. For the doping level near 1E18 ($1\times10^{18}$), only about 80% of the dopants are ionized at room temperature (see for example, Altermatt, P. P.; Schenk, A.; Schmithusen, B.; Heiser, G., "A simulation model for the density of states and for incomplete ionization in crystalline silicon. II. Investigation of Si:As and Si:B and usage in device simulation," Journal of Applied Physics, vol. 100, no. 11, pp. 113715, 113715-7, December 2006), which means the free carrier concentration may 20% lower than what we usually assume (100% ionization), causing the model without I.I to deviate from experiment.

Interestingly, some electrical properties like PN junction capacitance and conductively of doped silicon are not affected by I.I. For the junction capacitance, because the Fermi level in the depletion region is far away from the impurity level, essentially 100% ionization occurs. Thus the depletion width will not be affected by the I.I. For the conductivity, the I.I effect is absorbed in the measured mobility value, so no correction on carrier concentration is needed.

Simulation Model Calibration

To verify the accuracy of the modeling technique presented above, we fabricated silicon phase shifters based on lateral PN junctions. VπL, optical loss, and junction capacitance are experimentally measured, and compared with the simulation model.

The phase shifters were fabricated on SOI wafer with 220 nm top silicon and 2 μm BOX. The 500 nm wide waveguide was patterned and formed by an anisotropic partial silicon etch, leaving a 90 nm thick silicon layer in the strip load region. Then the waveguide was implanted by boron with the right half covered by photo resist. Similarly, the right half of the waveguide was implanted by phosphorus with the left half covered. The lateral PN junction is designed to have a nearly uniform doping concentration of $2 \times 10^{18}/cm^3$ on the P side and $3 \times 10^{18}/cm^3$ on the N side. The whole structure was then annealed in an RTA step similar to that described previously. The details of the implantation steps and the RTA step are listed in Table 2.

TABLE 2

Implantation and annealing conditions of a lateral junction phase shifter

| Step | Species | Energy/ KeV | Dose/cm² | Implantation Window | Tilt Angle |
|---|---|---|---|---|---|
| 1 | Boron | 10 | $1.2 \times 10^{13}$ | (−1, 0) | 0 |
| 2 | Boron | 35 | $3.0 \times 10^{13}$ | (−1, 0) | 0 |
| 3 | Phos | 40 | $2.5 \times 10^{13}$ | (0, 1) | 0 |
| 4 | Phos | 135 | $6.0 \times 10^{13}$ | (0, 1) | 0 |
| 5 | RTA | | | 1030° C. 5 s | |

The performance of the phase shifter was characterized experimentally based on two types of structures. First, unbalanced Mach-Zehnder interferometers with phase shifters loaded in both arms were used to measure the VπL and junction capacitance of the phase shifter. The DC phase shift is measured by applying a bias voltage on one arm of the MZ and recording the change of transmission spectrum. The junction capacitance on the phase shifter is determined by the phase of S11 parameter on the MZI and a metal de-embedding structure similar to the methods described in T. Baehr-Jones, R. Ding, Y. Liu, A. Ayazi, T. Pinguet, N. C. Harris, M. Streshinsky, P. Lee, Y. Zhang, A. E. Lim, T. Y. Liow, S. H. Teo, G. Q. Lo, and M. Hochberg, "Ultralow drive voltage silicon traveling-wave modulator," Opt. Express 20(11), 12014-12020 (2012). A single phase shifter structure with electrodes is fabricated to characterize the optical loss at different bias voltage. A control structure with the same waveguide length but no P/N implantation is measured at the same time as a reference.

Figure 3A:
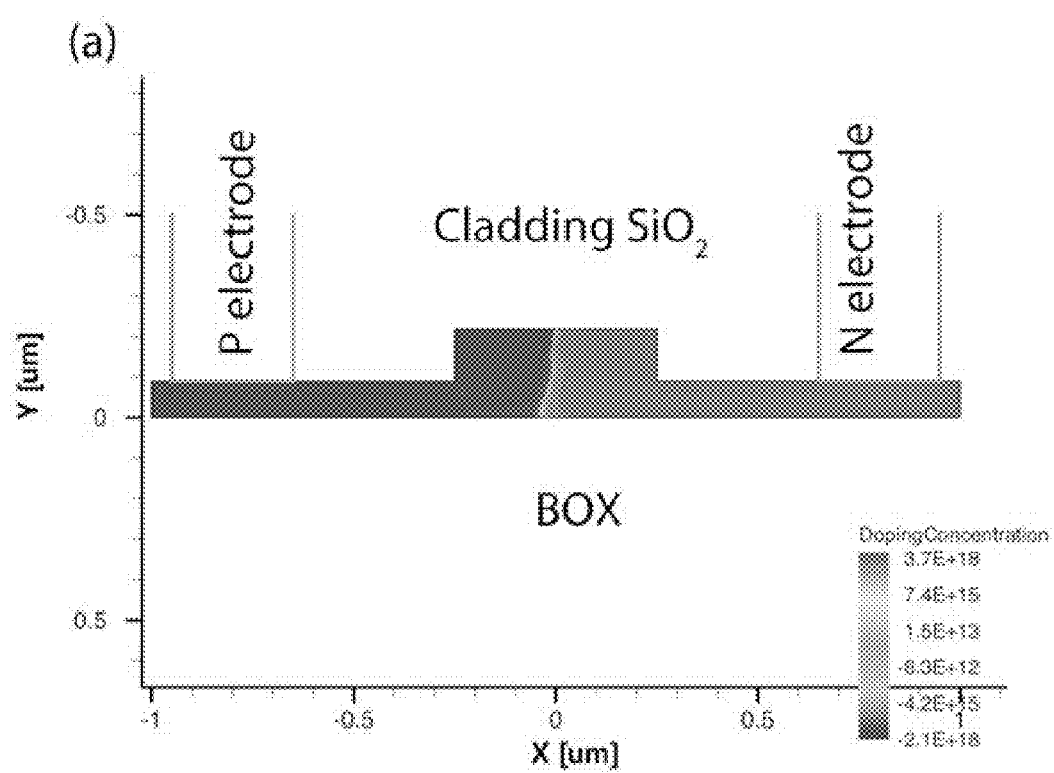
FIG. 3A is a diagram showing the non-planar doping profile of the cross-section of the lateral junction phase shifter.

The test result and comparison with the simulation model is presented in FIG. 3A through FIG. 3D. The example shown in FIG. 3A is a test profile that had a non-planar region with an overlap of tens of nanometers rather than hundreds of nanometers as depicted in FIG. 1A and FIG. 4A. This test structure was fabricated to provide a sample that could be measured and that could be modeled to determine how well the modeling agrees with the measured data.

Figure 3B:
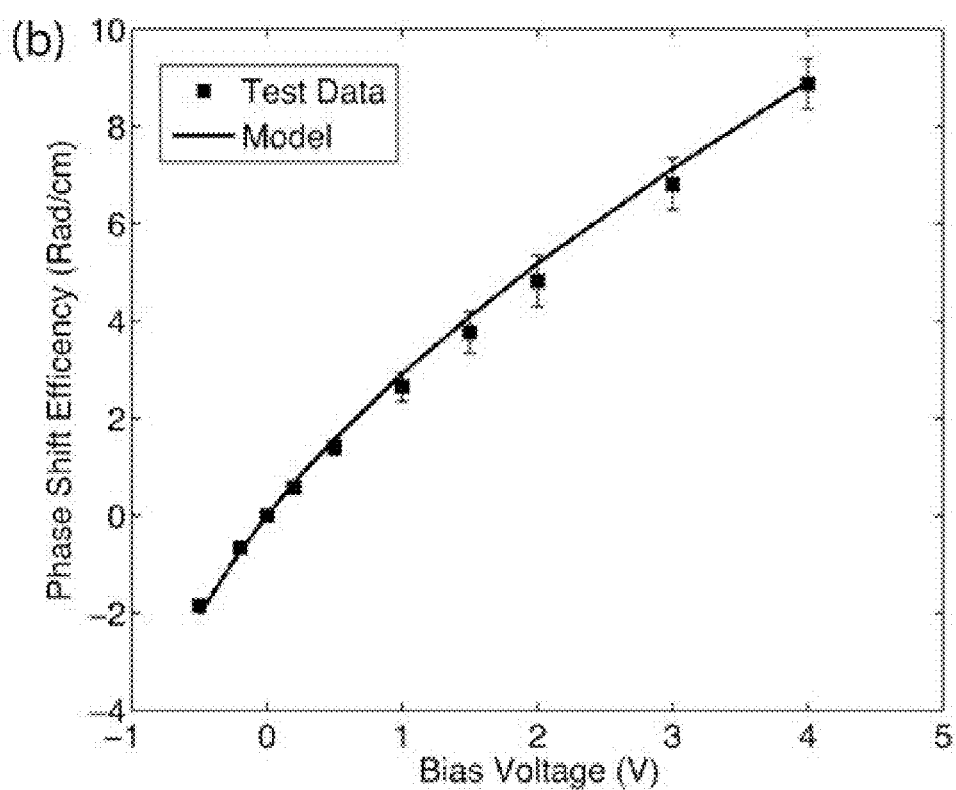
FIG. 3B is a graph showing the measured and simulated phase shift as a function of bias voltage.
Figure 4A:
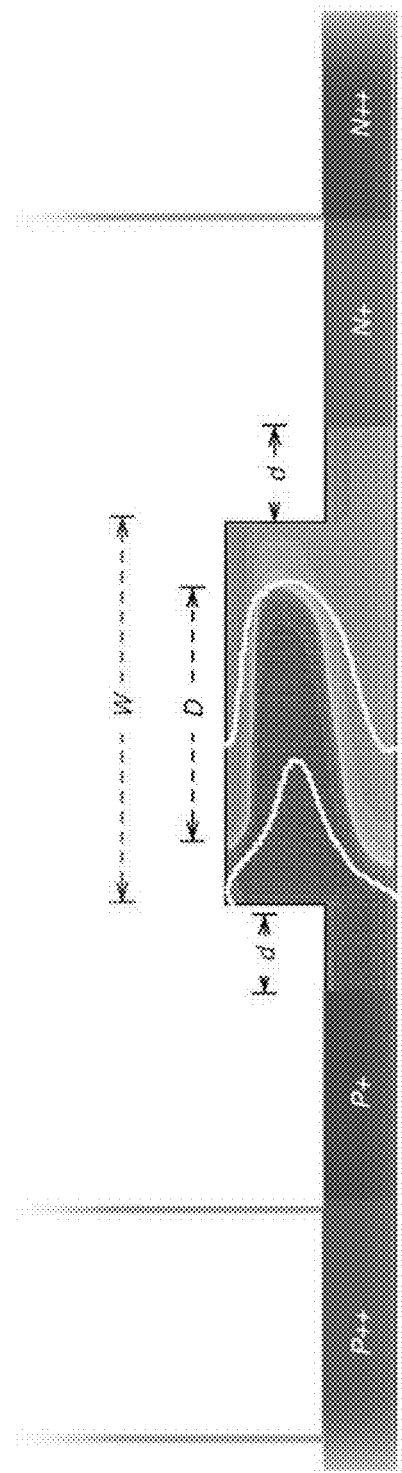
FIG. 4A is a diagram showing the configuration of the described phase shifter. The white lines show the depletion region at 3V reverse bias.

FIG. 3B is a graph showing the measured and simulated phase shift as a function of bias voltage.

Figure 3C:
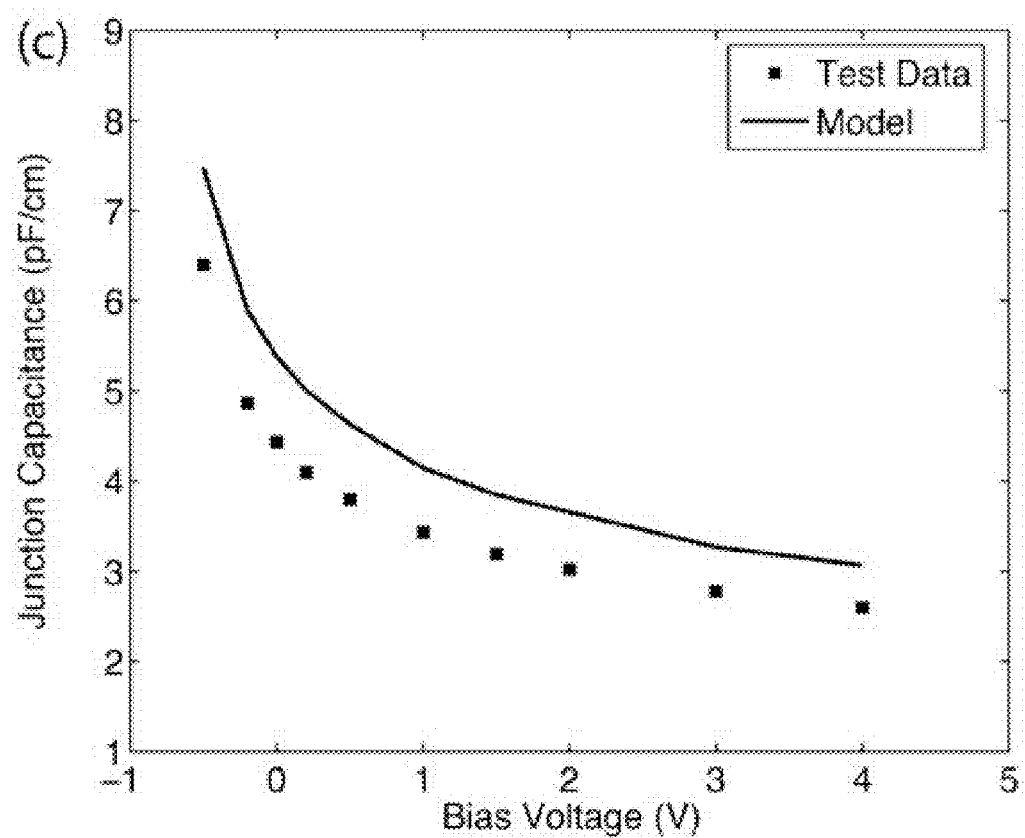
FIG. 3C is a graph showing the measured and simulated junction capacitance as a function of bias voltage.

FIG. 3C is a graph showing the measured and simulated junction capacitance as a function of bias voltage.

Figure 3D:
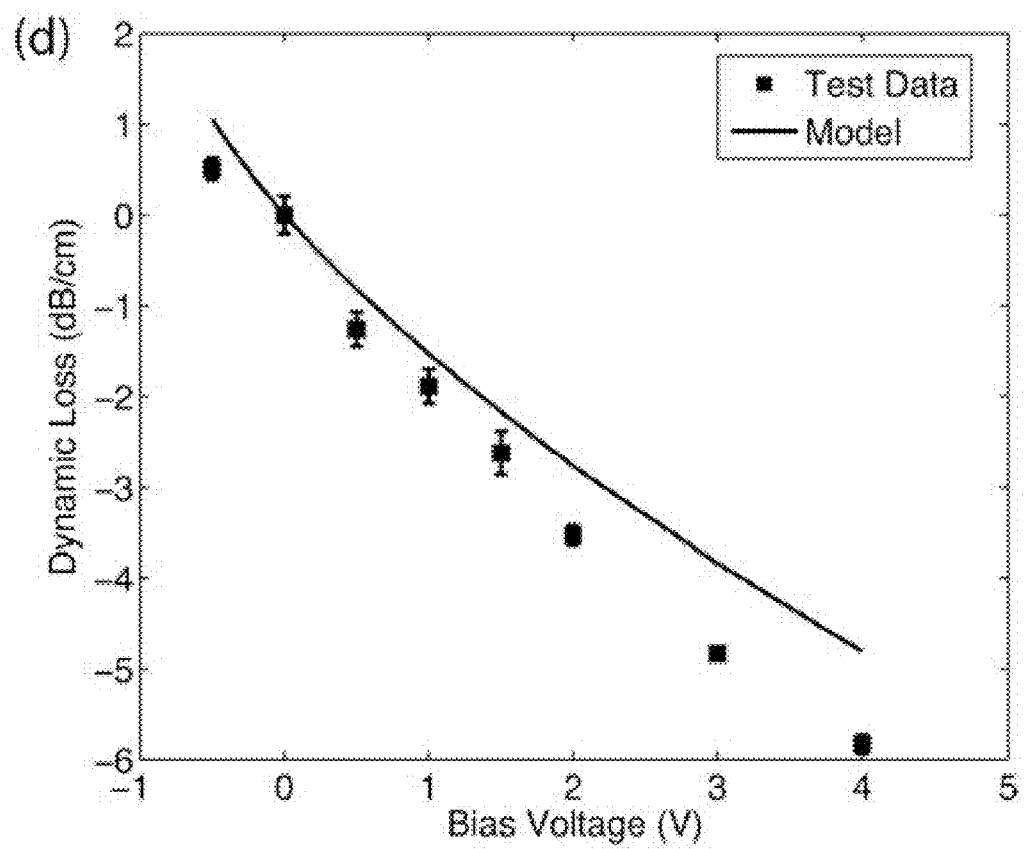
FIG. 3D is a graph showing the measured and simulated dynamic loss as a function of bias voltage.

FIG. 3D is a graph showing the measured and simulated dynamic loss as a function of bias voltage.

The PN junction is reverse biased for positive bias voltage in the plots. As we can see, the predicted phase shift efficiency is in very good agreement with the experiment data. We note that in our model, due to incomplete ionization, the phase shift predicted is lowered by 15%. This is in nearly perfect agreement with the measured data, as a result of this correction. Slight discrepancies are seen in other metrics; the optical loss (both dynamic and static) is around 22% higher than expected, and the capacitance is 18% lower than expected.

S Junction Performance Analysis

The performance of the phase shifter is analyzed based on the calibrated model. Our investigation focused on the effects of waveguide width and overlap ratio on the metrics of the phase shifter. We show that by tuning the waveguide width and implantation overlap ratio, the VπL, loss, and bandwidth of the phase shifter can be readily tuned to meet the requirement of different types of devices. The final junction performance reported here are projected from the model presented above by assuming the optical loss will be 22% higher and capacitance 18% lower than the model, as calibrated from the simulation results compared to observed data.

The configuration of the phase shifter is shown in FIG. 4A. The width of the rib waveguide is W and the slab height is 90 nm. In different embodiments, W was 500 nm, 600 nm, 700 nm and 800 nm. The implantation overlap is D (defined by the boron and phosphorus implantation masks). D is kept to be at least 100 nm less than W, ensuring at least 50 nm P and N type doped margin in the waveguide. Intermediate implantations P+ and N+ targeting at concentration of 1.5E19 are applied in the slab silicon to improve the conductivity. The P+ and N+ implantations are placed 200 nm away from the edge of the waveguide to reduce the extra optical loss. Electrodes are placed 700 nm away from the waveguide.

FIG. 4B through FIG. 4E show the simulated performance of the phase shifter for different waveguide width W and overlapping ratio D/W. For each waveguide width, the modulation efficiency VπL and optical loss decreases as the overlapping percentage increase. For a 600 nm waveguide, 0.3 V·cm VπL and 20 dB/cm loss is achieved for a 0.8 overlapping ratio. This is as expected since a longer length of implantations overlapping results in a larger PN junction area, and therefore stronger interaction with the optical mode. For the same overlapping ratio, a wider waveguide appears to have lower VπL value, because the optical mode is more concentrated in the core of the waveguide. The optical loss decreases as the overlap ratio increases. This is because in the overlap region, P and N type dopant compensate each other, resulting in a lower effective doping level and a reduced optical loss. The overlap region or non-planar junction interface can look like the English Letter "C" or the English letter "U" as is seen in FIG. 4A. In. FIG. 4A, the p-type region is on the concave side of the non-planar junction interface and the n-type region is on the convex side of the non-planar junction interface. It is believed that it is also possible to construct similar p-n junctions in which the n-type region is on the concave side of the non-planar junction interface and the p-type region is on the convex side of the non-planar junction interface, e.g., a non-planar junction interface that curves in the opposite direction to that shown in FIG. 4A. In other embodiments, a non-planar junction that has the shape of the English letter "S" can be fabricated.

The intrinsic bandwidth of the phase shifter is estimated by the junction capacitance and series resistance $f_{3\ dB}=1/(2\pi RC)$. The junction capacitance is obtained by a small signal AC simulation in Sentaurus Device, and the series resistance is estimated by adding the resistance in the silicon slab and the marginal region of the waveguide core. The resulting intrinsic bandwidth is plotted in FIG. 4E. As we can see in FIG. 4D, as the waveguide width and overlap ratio increase, the bandwidth decreases considerably, mainly due to the increased capacitance. For 600 nm waveguide width, and 0.8 overlap ratio, a compelling intrinsic bandwidth of 42 GHz can still be obtained. If needed, higher bandwidth can be readily achieved.

Figure 4C:
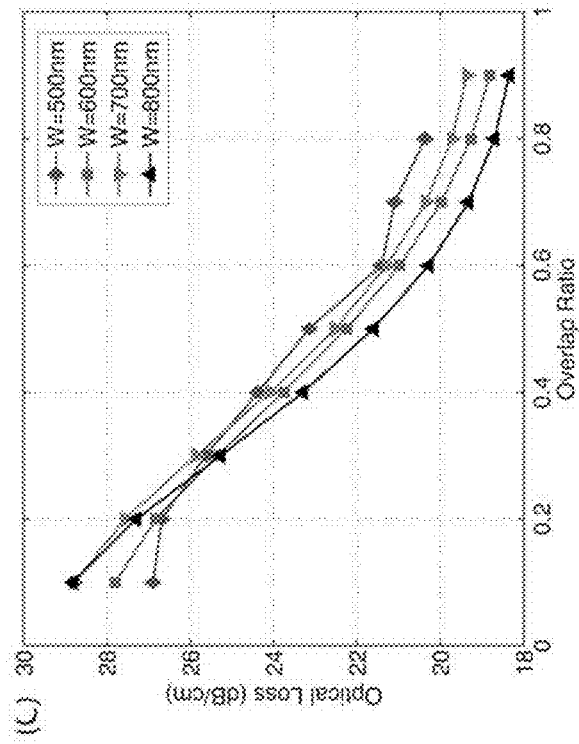
FIG. 4C is a graph illustrating the optical loss as a function of waveguide width and overlap ratio.
Figure 4B:
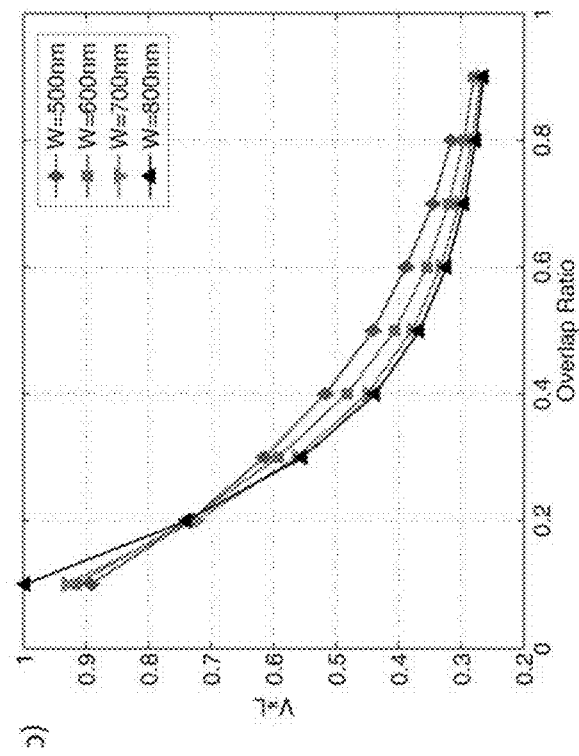
FIG. 4B is a graph illustrating the projected $V\pi L$ as a function of waveguide width and overlap ratio.
Figures 4D, 4E:
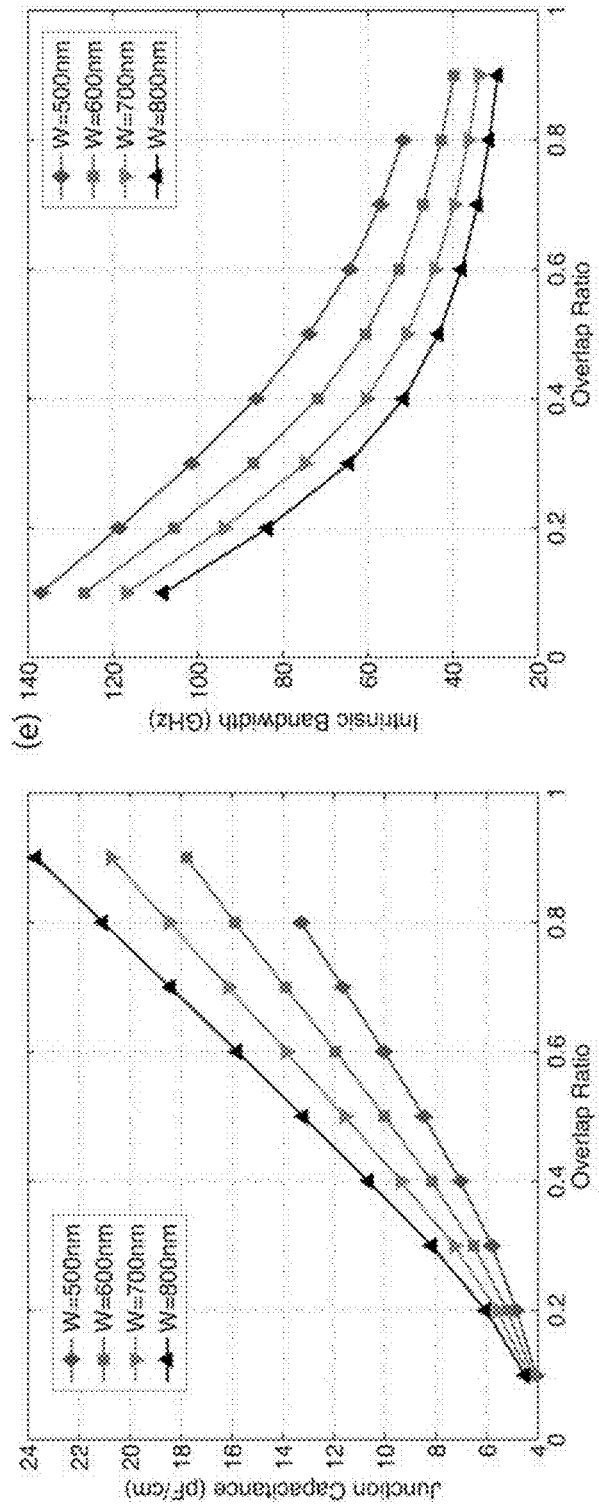
FIG. 4D is a graph illustrating the junction capacitance as a function of waveguide width and overlap ratio.
FIG. 4E is a graph illustrating the intrinsic bandwidth as a function of waveguide width and overlap ratio.

Turning to FIG. 4B and FIG. 4C respectively, the projected low $V_\pi L$ of 0.3 V·cm and optical loss of 20 dB/cm is a significant improvement over the current record 0.62 V·cm, 36 dB/cm in both aspects, for a geometry that does not require ultra-high resolution inter-digitation.

We have described a new silicon modulation geometry based on an S-junction shape. We have shown that typical approaches to modeling silicon pn-junction geometries need to be calibrated through the inclusion of second order effects, such as surface segregation, and incomplete ionization, to be completely accurate in regimes with high dopant concentrations and fine-structure in the dopant distribution. We believe that both our described geometry and modeling approach will be of use to the community.

Application Examples

FIG. 5A is an illustration of a Mach Zehnder interferometer built using devices fabricated according to principles of the invention. In FIG. 5A a Mach Zehnder interferometer (MZI) modulator using the described phase shifter has a light input (optical input 510) from the left waveguide and an output (optical output 530) from the right. The phase shifters 520 are loaded on both arms.

FIG. 5B is a diagram illustrating the detailed doping mask for the phase shifter, in which N and P implantations overlap in the center of the waveguide.

FIG. 5C is a diagram illustrating a more detailed view of a portion of the doping mask in FIG. 5B.

Figure 5D:
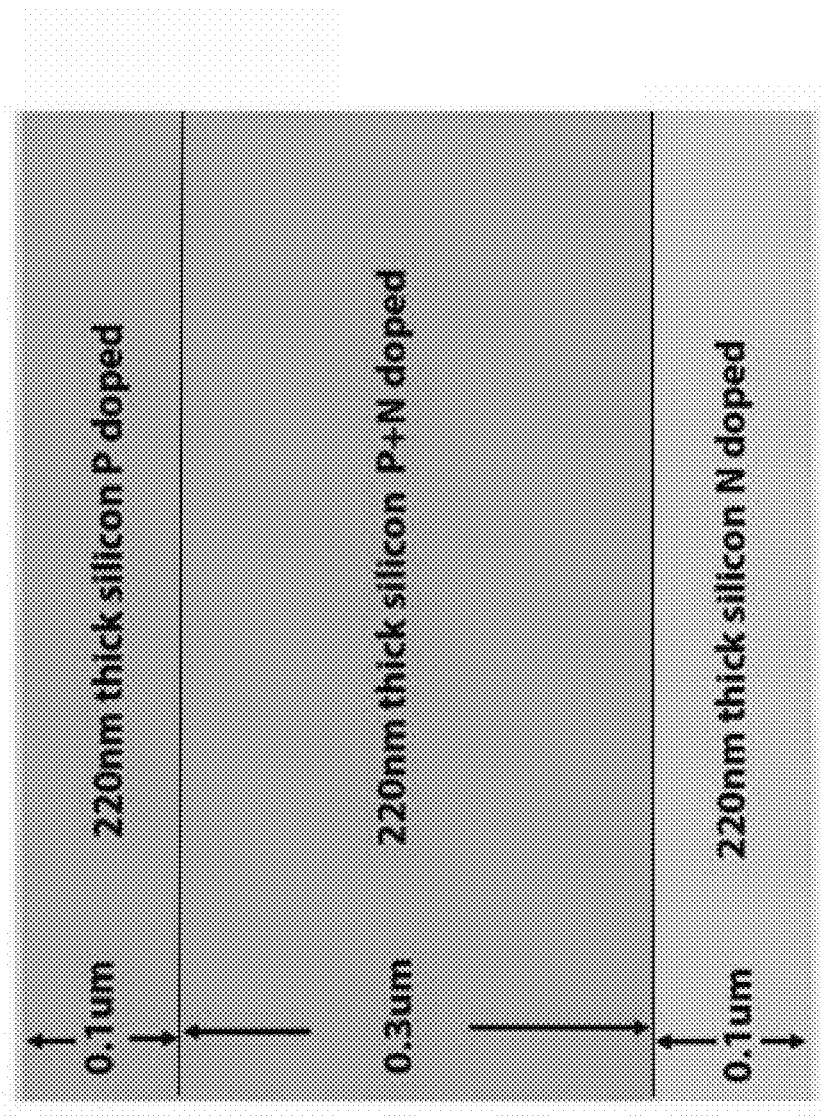
FIG. 5D is a diagram illustrating the dimensions of layers in the center of the waveguide.

FIG. 5D is a diagram illustrating the dimensions of layers in the center of the waveguide. The dimensions presented in the diagrams are typical dimensions in a preferred embodiment.

Figure 6:
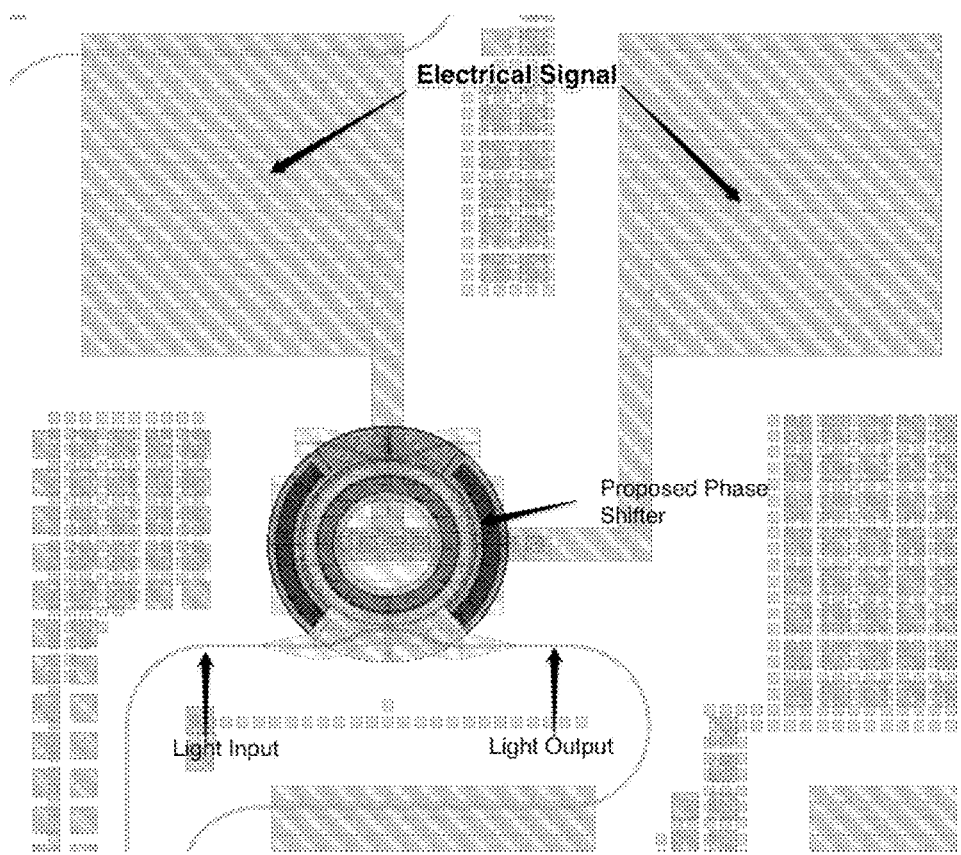
FIG. 6 is an illustration of a ring modulator constructed using devices fabricated according to principles of the invention.

FIG. 6 is an illustration of a ring modulator constructed using devices fabricated according to principles of the invention. In FIG. 6 there are shown electrical pads for communicating an electrical signal to a phase shifter (which in the embodiment illustrated has a circular configuration). Light circulating in the phase shifter can be modulated with the electrical signal that is provided at the electrical pads. There are shown a light input port and a light output port at opposite ends of an optical waveguide that is in optical communication with the phase shifter. Light that enters on the optical input port passes through the phase shifter and interacts by evanescent waves with modulated light circulating in the phase shifter, thereby modulating the light that enters at the optical input port. The modulated light exits at the optical output port and can be transmitted or otherwise used outside the modulator.

Definitions

Unless otherwise explicitly recited herein, any reference to an electronic signal or an electromagnetic signal (or their equivalents) is to be understood as referring to a non-transitory electronic signal or a non-transitory electromagnetic signal.

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical modulator semiconductor device comprising:
   a substrate;
   an optical waveguide disposed upon the substrate;
   a p-type region of semiconductor material disposed within said optical waveguide, said p-type region having a p-type contact terminal;
   an n-type region of semiconductor material disposed within said optical waveguide, said n-type region having an n-type contact terminal;
   wherein said n-type region and said p-type region share a non-planar junction interface as viewed in a cross section taken perpendicular to a light propagation direction in said optical waveguide; and
   wherein said non-planar junction interface is configured to form at least two p/n junctions disposed one over the other in a direction normal to the substrate, so as to enhance an overlap between an optical mode in said optical waveguide and said non-planar junction interface when said optical modulator semiconductor device is operational.

2. The optical modulator semiconductor device of claim 1 wherein the optical waveguide includes an N and P implantation overlap region comprising the non-planar junction interface.

3. The optical modulator semiconductor device of claim 1, wherein said non-planar junction interface comprises a curved surface having a convex side and a concave side.

4. The optical modulator semiconductor device of claim 3, wherein said curved surface resembles the English letter "U".

5. The optical modulator semiconductor device of claim 3, wherein said curved surface resembles the English letter "C".

6. The optical modulator semiconductor device of claim 3, wherein said curved surface resembles the English letter "S".

7. The optical modulator semiconductor device of claim 3, wherein said p-type region is on said concave side of said non-planar junction interface and said n-type region is on said convex side of said non-planar junction interface.

8. The optical modulator semiconductor device of claim 3, wherein said n-type region is on said concave side of said non-planar junction interface and said p-type region is on said convex side of said non-planar junction interface.

9. The optical modulator semiconductor device of claim 1, wherein said semiconductor is silicon.

10. The optical modulator semiconductor device of claim 1, wherein said p-type region is doped with boron.

11. The optical modulator semiconductor device of claim 1, wherein said n-type region is doped with phosphorous.

12. The optical modulator semiconductor device of claim 1, wherein said n-type region is doped with arsenic.

* * * * *